United States Patent

Jung et al.

(10) Patent No.: US 6,657,162 B1
(45) Date of Patent: Dec. 2, 2003

(54) BURNER HEAD OF AN ELECTRIC ARC WELDING OR CUTTING BURNER WITH CONTACT NOZZLE SUPPORTED IN POSITIVE FIT

(75) Inventors: Michael Jung, Butzbach (DE); Hubert Metzger, Lich (DE)

(73) Assignee: Alexander Binzel Schweisstechnik GmbH & Co. KG, Buseck (DE)

( * ) Notice: Subject to any disclaimer, the term of this patent is extended or adjusted under 35 U.S.C. 154(b) by 0 days.

(21) Appl. No.: 09/926,488

(22) PCT Filed: May 25, 2000

(86) PCT No.: PCT/EP00/04762

§ 371 (c)(1),
(2), (4) Date: Nov. 13, 2001

(87) PCT Pub. No.: WO00/73700

PCT Pub. Date: Dec. 7, 2000

(30) Foreign Application Priority Data

May 31, 1999 (DE) .......................................... 199 24 728
Jul. 22, 1999 (DE) .......................................... 199 34 369

(51) Int. Cl.$^7$ ................................................ B23K 9/28
(52) U.S. Cl. .............................................. 219/137.61
(58) Field of Search ...................... 219/137.61, 137.31, 219/137.42, 137.44, 137.63

(56) References Cited

U.S. PATENT DOCUMENTS

| | | | |
|---|---|---|---|
| 1,600,732 A | | 9/1926 | Harris |
| 2,263,655 A | | 11/1941 | Stettner |
| 3,375,090 A | | 3/1968 | Marra |
| 3,541,298 A | * | 11/1970 | Carkhuff ................. 219/137.63 |
| 3,825,720 A | * | 7/1974 | Zillinger, Jr. .......... 219/137.44 |
| 4,158,763 A | * | 6/1979 | Moerke ................. 219/137.42 |
| 4,282,419 A | * | 8/1981 | Auer ..................... 219/137.61 |
| 5,440,100 A | * | 8/1995 | Stuart et al. ........... 219/137.61 |

FOREIGN PATENT DOCUMENTS

| | | |
|---|---|---|
| CH | 472632 | 6/1969 |
| DE | 866276 | 2/1953 |
| DE | 944541 | 6/1956 |
| DE | 1404587 | 12/1968 |
| DE | 294330 | 9/1991 |
| DE | 4137297 | 5/1993 |

* cited by examiner

*Primary Examiner*—Clifford C. Shaw
(74) *Attorney, Agent, or Firm*—Charles P. Boukus, Jr.

(57) ABSTRACT

The invention relates to a burner head (9) of an electric arc welding or cutting head, with preferably a melting wire electrode, having a contact nozzle (1) and a spring chuck (2) for releasably holding the contact nozzle (1) on the burner head (9). Both of the contact nozzle and the spring chuck (2) have corresponding means to bring about positive locking between the contact nozzle (1) and the spring chuck in the contact nozzle (1) that is supported on the burner head (9).

9 Claims, 1 Drawing Sheet

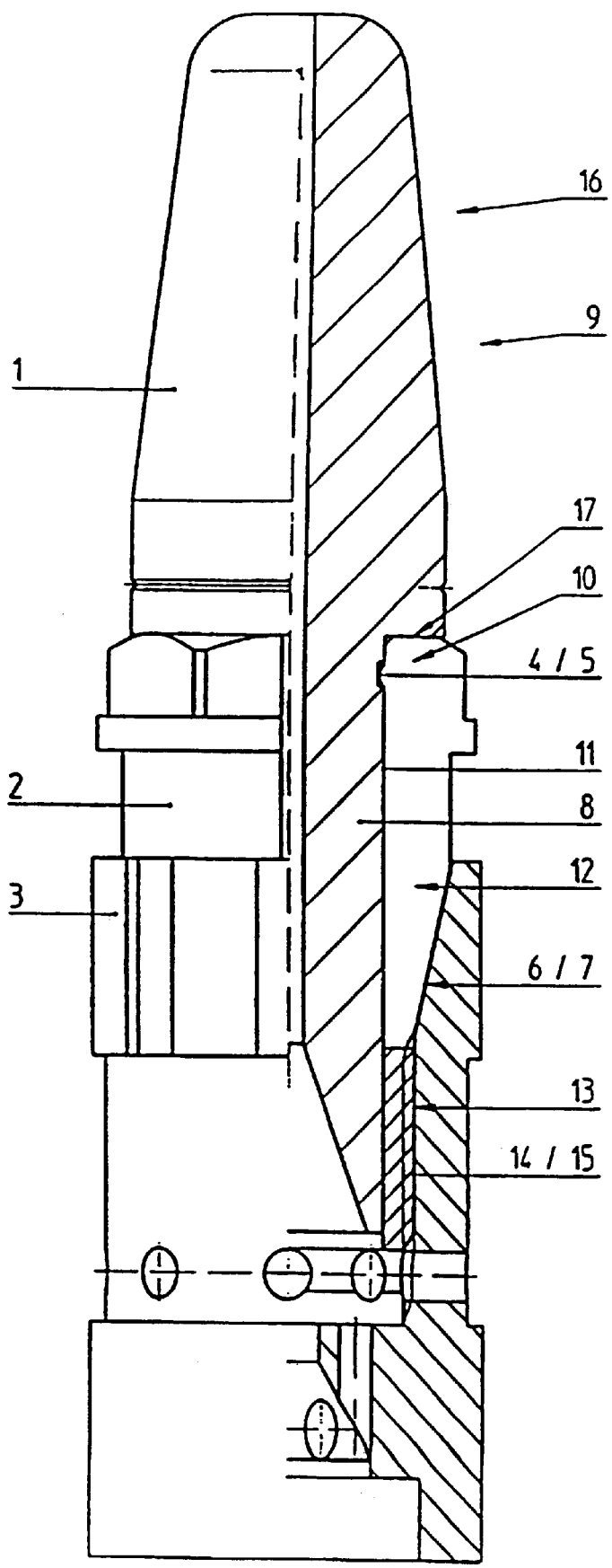

BURNER HEAD OF AN ELECTRIC ARC WELDING OR CUTTING BURNER WITH CONTACT NOZZLE SUPPORTED IN POSITIVE FIT

The invention relates to a burner head of a electric arc welding burner or cutting burner preferably with a melting electrode, such as a wire electrode or the like, and having a contact nozzle, and the burner head has a spring chuck for releasably holding the contact nozzle on the burner head.

Contact nozzles, which are also known as current contact nozzles, involve a replaceable metal part mounted on the tip of a electric arc welding burner or cutting burner, for instance with a melting electrode. The contact nozzle has the function on the one hand of guiding the wire electrode, and on the other, by means of the contact nozzle, the welding current is transmitted to the wire electrode and heat is additionally dissipated. The fixation of the contact nozzle to the burner neck is done by nonpositive engagement, by way of either a clamping connection or a thread. The clamping connection of the contact nozzle and the spring chuck makes large transitional faces available. However, the clamping connection cannot assure an operationally safe and reliable connection in every case; especially at wire feeding speeds of more than 40 m/s, in fixed burners or even because merely of the friction of the wire at the contact nozzle, expulsion of the contact nozzle can occur. Using a thread does provide a secure connection, but the attainable sizes of transitional faces for current and heat, for a reasonable thread length and structural size, are often too small.

From Swiss Patent CH 472 632, a burner handle is already known which has an oxygen supply line and a combustion gas supply line. A weld insert with a mixing chamber is also provided. The handle and the weld insert are screwed together by a connection nipple in that the injector and a top mounting piece is inserted. The latter part is movable and has a sealing ball seat on both ends.

From German Patent Disclosure DE 41 37 297 A1, a gas burner nozzle for creating a microscopic flame for use in precision technology and microtechnology is known. The nozzle insert is held in the gas burner nozzle as a result of the fact that, after the insertion of the nozzle insert into a gas tubule, this tubule is ground down by means of a grinding wheel. The crimped edge created in the grinding places itself over the edge of the insert and thus assures that the insert will be held in the gas tubule.

From East German Patent Disclosure DD 294 330 A5, a cutter head with an oxygen supply is known, in which the cutter nozzle is in two parts. A central, axial part has two cylindrical bearings, which mesh with the outer part of the cutter nozzle via a press fit.

By comparison, the object of the present invention is to improve a contact nozzle having the characteristics recited at the outset in such a way that secure holding of the contact nozzle on the burner head is assured, and in addition, a large transitional face exists between the contact nozzle and the burner head.

According to the invention, in the burner head having the characteristics recited at the outset, this object is attained essentially in that the contact nozzle and the spring chuck each have means, corresponding with one another, which when the contact nozzle is held on the burner head form a positive fit between the contact nozzle and the spring chuck.

This assures that because of the means corresponding with one another in a positive way, the contact nozzle is securely held on the burner head. Because a spring chuck is also used for releasable holding, large transitional faces are available to dissipate the heat and transmit the welding current. The invention combines the advantages of a clamping connection with those of a threaded connection.

In a first advantageous feature of the invention, the corresponding means are embodied as a tongue-and-groove means.

However, the possibility also exists of embodying the means as an annular groove/collar.

In an advantageous refinement of the invention, that the contact nozzle has a rearward, substantially cylindrical shaft, which over its circumference has one or more annularly distributed plunge-cut recesses or an encompassing annular groove, which groove or recesses preferably receive a corresponding protrusion, a corresponding collar, or a protruding annular rib or the like that is provided on the front portion of the spring chuck. It is understood that the plunge-cut recesses or the like can naturally be provided on the spring chuck as well, in which case the corresponding protuberances or the like are then disposed on the contact nozzle, so that in the final analysis, once again, protuberances or corresponding plunge-cut recesses for holding the contact nozzle on the burner head are in engagement with one another.

Advantageously, the spring chuck has a substantially central bore, in which the shaft of the contact nozzle is received. By this provision as well, a large-area connection between the spring chuck and the contact nozzle is assured.

In another advantageous refinement of the invention, the spring chuck, in a middle portion, has a conical or cone-shaped outer contour, which is received by a corresponding inner contour, such as a bored recess of the burner head. These corresponding contours on the one hand form a large-area connection between the spring chuck and the burner head, and on the other, they serve to close and open the spring chuck.

For simple release and fixation of the contact nozzle to the burner head, the spring chuck, on the rearward free end, has a male thread, which is in engagement with a female thread of the burner head. By simple recessing of the spring chuck from the outside or inside, the cheeks of the spring chuck, because of the corresponding conical contours of the spring chuck and burner head, are pressed against the shaft of the contact nozzle, or in the opposite direction of rotation are released from it. The contact nozzle can thus be replaced extremely simply and quickly.

Furthermore, in another advantageous refinement of the invention, the contact nozzle, between the shaft and the free portion, has an annular shoulder, which is braced on the front portion of the spring chuck. The annular shoulder thus forms an abutment, which limits the depth to which the shaft of the contact nozzle can plunge into the spring chuck. When the shaft of the contact nozzle has been introduced all the way into the spring chuck, the means corresponding with one another are in engagement, or can be brought into engagement with one another by tightening the spring chuck.

Finally, it proves to be extremely advantageous that a large-area non-positive connection exists between the contact nozzle, in particular the shaft, and the burner head, in particular the spring chuck.

Further objects, advantages, characteristics and possible applications of the present invention will become apparent from the ensuing description of an exemplary embodiment in conjunction with the drawing. All the characteristics described and/or shown in the drawing, either taken alone or in arbitrary useful combination, form the subject of the present invention, independently of their summary in the claims or the dependencies thereof.

BRIEF DESCRIPTION OF THE DRAWINGS

The sole drawing FIGURE is a plan view on an exemplary embodiment of a burner head according to the invention, partly in section.

The burner head 9 of a electric arc welding burner or cutting burner, preferably with a melting wire electrode, has a contact nozzle 1, which is held releasably on the burner head 9 by means of a spring chuck 2. The contact nozzle 1 and the spring chuck 2 each have means corresponding with one another, which when the contact nozzle is held on the burner head 9 form a positive fit between the contact nozzle 1 and the spring chuck 2. These means can be embodied quite generally as a tongue-and-groove means or as an annular groove/collar.

The contact nozzle 1 has a substantially cylindrical rear shaft 8, which has one or optionally a plurality of annularly distributed plunge-cut recesses 5 over its circumference. This plunge-cut recess 5, in the exemplary embodiment selected here, receives a collar 4, formed on the front portion 10 of the spring chuck 2, so that once the spring chuck 2 has been tightened, a positive-fit retention or connection exists between the contact nozzle 1 and the spring chuck 2.

The spring chuck 2 has a substantially central bore 11, in which the shaft 8 of the contact nozzle 1 is received. The spring chuck 2, in a middle portion 12, has a conical or cone-shaped outer contour 7, which is received by a corresponding inner contour, such as a bored recess 6 of the receptacle 3 of the burner head 9. On the rearward free end 13 of the spring chuck 2, a male thread 14 is provided, which is in engagement with a female thread 15 of the receptacle 3 of the burner head 9.

The contact nozzle 1, between the shaft 8 and the free portion 16, has an annular shoulder 17, which is braced on the front portion 10 of the spring chuck 2. The disposition of the annular shoulder relative to the front portion 10 of the spring chuck 2 is selected such that when the annular shoulder 17 is braced on the portion 10 of the spring chuck 2, the positive-fit means corresponding with one another are in engagement with one another.

Because of the special embodiment of the shaft 8, spring chuck 2 and receptacle 3 of the burner head 9, provision is made for a large-area, nonpositive connection between the contact nozzle 1 and the burner head 9.

If the contact nozzle 1 is inserted into the spring chuck 2, then the collar 4 formed on the front end of the spring chuck 2 locks into the plunge-cut recess 5 of the contact nozzle 1 in detent fashion and forms a positive-fit connection or retention between the contact nozzle 1 and the spring chuck 2. The collar 4 and plunge-cut recess 5 form interlocking members with abutment surfaces transverse to longitudinal forces (positive-fit connection or retention) in addition to the friction or gripping engagement (nonpositive connection) between the spring chuck 2 and shaft 8.

After that, the spring chuck 2 is screwed into the receptacle 3 of the burner head 9. By means of the conical inside-turned recess 6 in the receptacle 3, the spring chuck 2 is pressed together with a correspondingly embodied conical outer contour 7; the shaft 8 of the contact nozzle 1 is pressed over a large surface area against the inside-turned recess 6. By this provision, a large-area, nonpositive connection between the contact nozzle 1 and the spring chuck 2 is achieved. In addition, this connection is locked with a positive fit by means of the corresponding means, thus preventing the contact nozzle 1 from being forced out of the spring chuck 2 during operation of the welding burner in the event of seizing or in the event of inadequate nonpositive engagement, caused for instance by production and manipulation errors. This provision substantially enhances the safety and reliability of the process.

List of Reference Numerals

1—Contact nozzle
2—Spring chuck
3—Receptacle
4—Collar
5—Plunge-cut recess
6—Inside-turned recess
7—Outer contour
8—Shaft
9—Burner head
10—Front portion
11—Bore
12—Middle portion
13—Free end
14—Male thread
15—Female thread
16—Free portion
17—Annular shoulder

What is claimed is:

1. A burner head (9) of a electric arc welding burner or cutting burner preferably with a melting electrode, such as a wire electrode or the like, comprising a contact nozzle (1), and a burner head (9) having a spring chuck (2) for releasably gripping the contact nozzle (1) in the burner head (9), the contact nozzle (1) and the spring chuck (2) each having respective interlocking members with abutment surfaces transverse to longitudinal forces and which when the contact nozzle (1) is gripped in the burner head (9) form a positive fit between the contact nozzle (1) and the spring chuck (2).

2. The burner head of claim 1, wherein the interlocking members include a tongue and groove.

3. The burner head of claim 1, wherein the interlocking members include an annular collar mating with an annular groove.

4. The burner head of claim 1, wherein the contact nozzle (1) has a substantially cylindrical rearward shaft (8), which over its circumference has one or more annularly distributed plunge-cut recesses (5) or an encompassing annular groove, and the spring chuck (2) has a one or more corresponding inner protrusions a corresponding inner collar (4), or a an inward protruding annular rib or the like that is received in the annularly distributed plunge-cut recesses or the encompassing annular groove.

5. The burner head of claim 1, wherein the spring chuck (2) has a substantially central bore (11), and the contact nozzle (1) has a shaft (8) which is received and gripped within the central bore of the spring chuck.

6. The burner head of claim 1, further comprising a receptacle (3) having a bored recess (6) with a conical or cone-shaped contour, and wherein the spring chuck (2), in a middle portion (12), has a conical or cone-shaped outer contour (7), which is received by the bored recess (6) of the receptacle (3) of the burner head (9).

7. The burner head of claim 1, further comprising a receptacle (3) having a female thread (15), and wherein the spring chuck (2), on the rearward free end (13), has a male thread (14), which is in engagement with the female thread (15) of the receptacle (3) of the burner head (9).

8. The burner head of claim 1, wherein the contact nozzle (1), has a shaft (8), free portion (16), and an annular shoulder (17) between the shaft and the free portion and, which is braced against the front portion (10) of the spring chuck (2).

9. The burner head of claim 1, wherein the contact nozzle has a shaft (8) making a large-area non-positive connection with the spring chuck (2).

* * * * *